United States Patent [19]

Gallentine

[11] Patent Number: 4,689,957

[45] Date of Patent: Sep. 1, 1987

[54] HYDRAULIC TOOL SYSTEM

[75] Inventor: William Gallentine, Hood River, Oreg.

[73] Assignee: Galco, Inc., Bellevue, Wash.

[21] Appl. No.: 779,178

[22] Filed: Sep. 23, 1985

[51] Int. Cl.⁴ .......................... F16D 31/02; B25B 7/00

[52] U.S. Cl. .......................................... 60/481; 60/477; 81/301

[58] Field of Search .......................... 60/477, 479, 481; 30/180; 81/301

[56] References Cited

U.S. PATENT DOCUMENTS

| | | |
|---|---|---|
| 787,548 | 2/1908 | Marcy . |
| 2,059,446 | 11/1936 | Eastman . |
| 2,488,224 | 11/1949 | Mothorn . |
| 2,600,540 | 6/1952 | Johnson . |
| 3,058,214 | 10/1962 | Mekler . |
| 3,255,525 | 6/1966 | Frenzel . |
| 3,350,780 | 11/1967 | Artru . |
| 3,482,613 | 1/1968 | Jordan . |
| 3,498,188 | 3/1970 | Rodriguez . |
| 3,706,245 | 12/1972 | Van Schaik . |
| 3,812,766 | 5/1974 | Weiss . |
| 3,888,003 | 6/1975 | Brown . |
| 3,994,205 | 11/1976 | Ekdahl et al. . |
| 4,080,875 | 3/1978 | Repolovsky et al. . |
| 4,263,801 | 4/1981 | Gregory .......................... 81/301 X |
| 4,480,531 | 11/1984 | Mylius et al. . |

*Primary Examiner*—Allen M. Ostrager
*Attorney, Agent, or Firm*—Seed and Berry

[57] ABSTRACT

A system of hydraulic tools utilizing removably, replaceable and substantially interchangeable valve assemblies, fluid reservoirs and hydraulic driving mechanisms. The fluid reservoir maintains the hydraulic fluid under moderate pressure. The valve assembly can contain a hydraulic pump for powering the driving mechanism. The hydraulic pump preferably has displacement varying means for changing the power transfer ratio of the pump. The hydraulic assemblies are removably received in a variety of tool bodies.

27 Claims, 14 Drawing Figures

FIG. 5
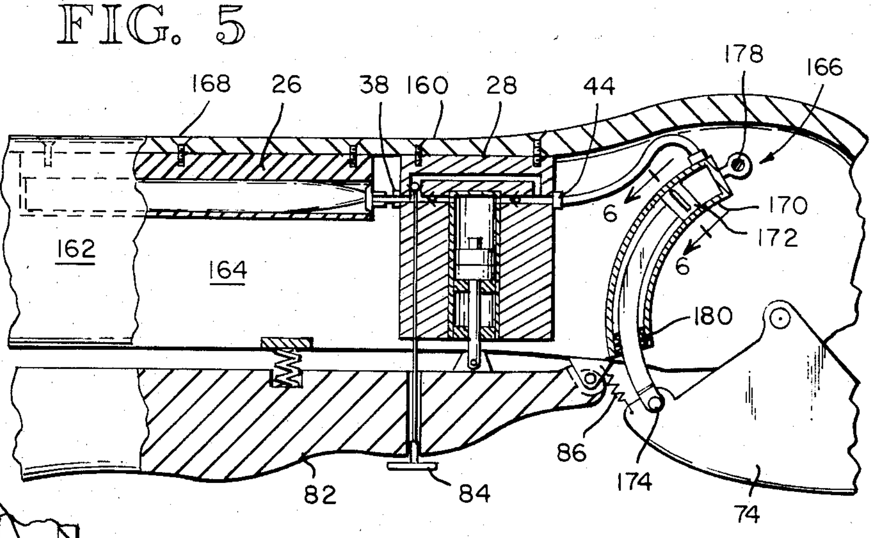
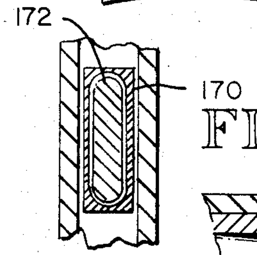
FIG. 6
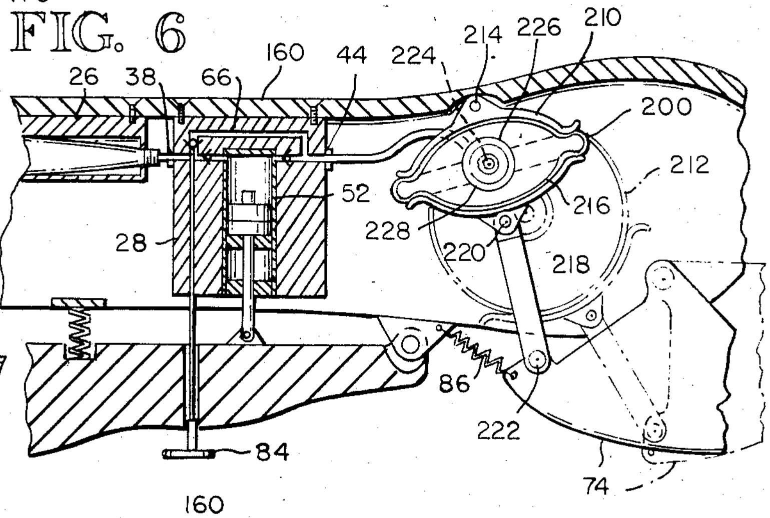
FIG. 7
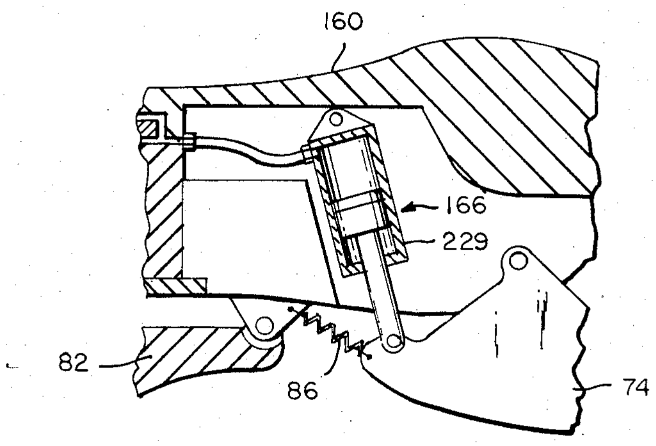
FIG. 8

FIG. 9
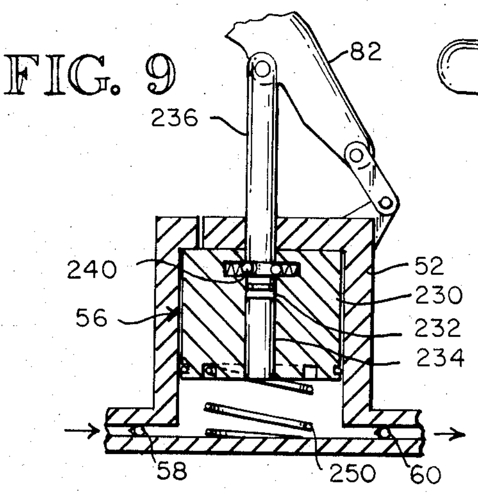
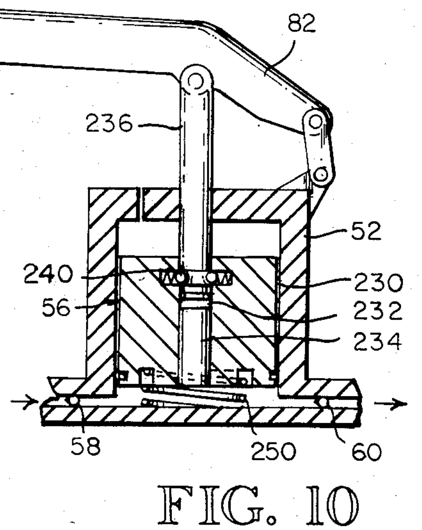
FIG. 10
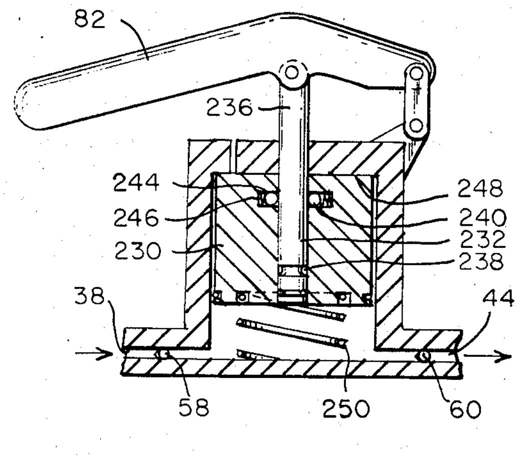
FIG. 11
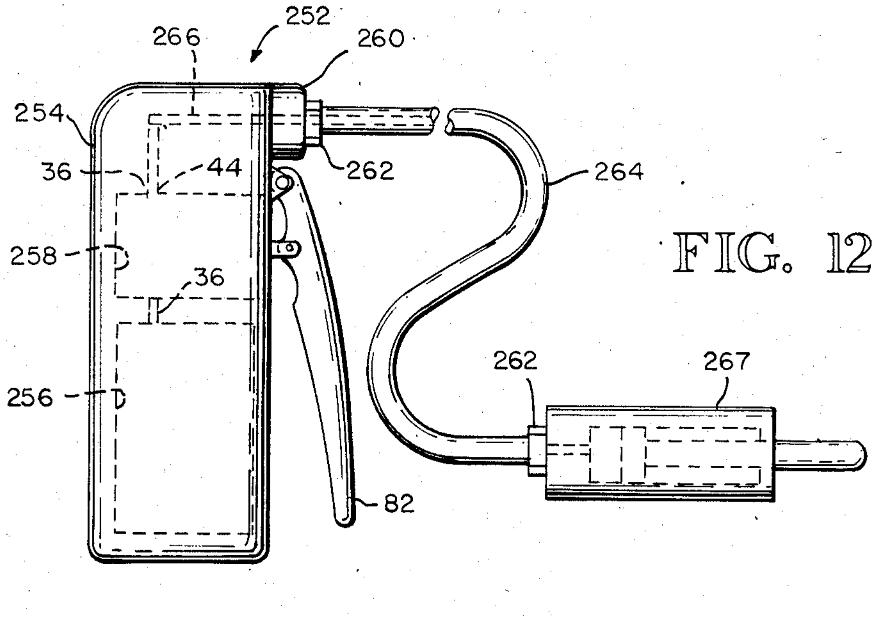
FIG. 12

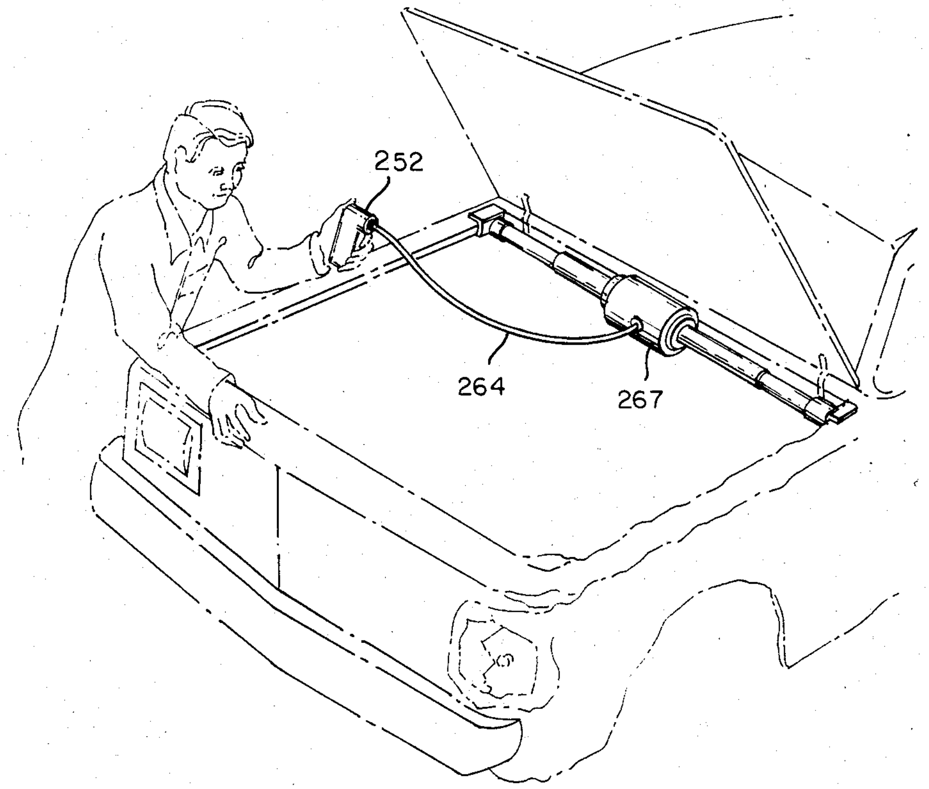
FIG. 13
FIG. 14
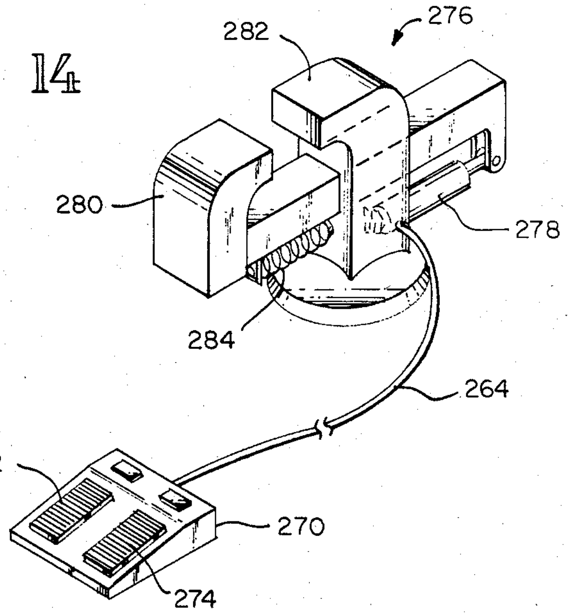

HYDRAULIC TOOL SYSTEM

TECHNICAL FIELD

The invention relates to hydraulic tools. Specifically, the invention relates to hydraulic tools using self-contained fluid reservoirs.

BACKGROUND OF THE INVENTION

The amount of force deliverable at the operative end of a hand tool is often limited by the length of the handle. For example, the amount of torque deliverable by a conventional box wrench is closely related to the length of the handle. Similarly, the compressive force deliverable by the jaws of conventional hand pliers is limited by the length of the handles. To achieve relatively large forces at the operative end of such tools, the handles have to be unacceptably long.

It has long been recognized that significant mechanical advantages can be achieved in tools by the use of fluid mechanics. In pneumatic devices for example, the displacements of the pump can be made much smaller than the displacement of the driving cylinder so that every stroke of the driving pump moves the jaws of a tool only a small increment. In this arrangement, the mechanical advantage achieved is great and large forces can be applied by the operative ends of the tool. It is also well known that due to the substantial noncompressibility of fluids, hydraulic tools can achieve greater operative forces than pneumatic tools. However, whereas pneumatic tools can be easily detached from a compressed air source, hydraulic tools must be continually attached to the hydraulic source to prevent loss of hydraulic fluid and introduction of air into the hydraulic circuit. In large hydraulic tools, these problems can be overcome with the use of valves, plugs, et cetera. In smaller tools, this practice is unacceptably inconvenient and mechanically difficult to execute and therefore requires that hydraulically operated hand tools carry their hydraulic fluid and power source on board. Due to these requirements, hydraulic hand tools are typically bulky, unwieldy and difficult to use.

Representative of such tools is the hydraulically operated hand tool disclosed in U.S. Pat. No. 3,058,214 issued to Mekler. The tool has a pressurized fluid reservoir which supplies a pump with fluid through a series of one-way valves for driving a piston. The driving piston operates a pivoting jaw. The tool hydraulic circuit within the complex and requires integrity of each valve to insure proper operation of the tool. Due to the complexity and consequent cost of the tool, these types of tools have not achieved significant commercial success. Failure of any one of the valves renders the tool inoperable. Furthermore, since the valve seats are typically formed as part of the tool body, the entire tool must be returned for repair of a single valve or other mechanism fails.

Another disadvantage of the hydraulic hand tool described is that the displacement of the pump mechanism is fixed. Therefore, a hydraulic hand tool which has a large mechanical advantage, that is wherein the surface area of the pump piston is relatively small as compared to the surface area of the driving piston, delivers a large amount of force to the jaws of the tool but is very slow to use. In such a tool, each stroke of the pump handle only moves the jaws of the tool a small increment. A large amount of power is delivered to the object in the jaws, but the tool requires a large amount of time to bring the open jaws of the tool onto the object. If the mechanical advantage of the hydraulic system is decreased so that the jaws close more quickly on the object therebetween, the amount of force deliverable by the jaws is correspondingly reduced.

Another disadvantage of the described tools is that each tool must be manufactured with its own individual hydraulic mechanisms since it is an integral part of the tool itself. This increases the cost of manufacture for a variety of tools. Furthermore the valve and pump mechanisms of one tool cannot easily be substituted for a malfunctioning pump or valve of another tool.

Thus, a need exists for a family of hydraulic tools which utilize substantially interchangeable hydraulic mechanisms, which have a large mechanical advantage and which are quick and easy to use.

DISCLOSURE OF THE INVENTION

It is an object of the present invention to provide a family of hydraulic tools which are easily repairable and manufacturable.

It is also an object of the present invention to provide a family of hydraulic tools which have substantially interchangeable hydraulic parts.

It is further object of the present invention to provide a family of hydraulic tools which have external dimensions similar to those of conventional tools.

It is another object of the present invention to provide a family of hydraulic tools which provide a large mechanical advantage but which are quick to use.

The invention achieves these and other objects and advantages, which will become apparent from the description which follows , by utilizing modular hydraulic subassemblies within each tool. Some of these subassemblies are interchangeable between tools, greatly reducing the down time of such tools. The tools utilize a modular hydraulic fluid reservoir which maintains the hydraulic fluid under pressure regardless of the position of the tool in use. The tools also have a hydraulic pump and valves which provide fluid flow to a hydraulic actuator mechanism. Each of these elements are modularized and, in one embodiment, are received into a frame which fits into the tool. Thus, the frame or the individual subassemblies within the frame can be replaced or exchanged and reinserted into the tool so that the tool is immediately available for use if any one of the subassemblies fails. The pump can be provided with a two-stage mechanism which varies the power transfer ratio of the pump to the driving mechanism to allow the jaws of the tool to quickly bear down on the object in the jaws and then to apply large forces to the object once the jaws have made contact.

In one embodiment the hydraulic driving mechanism which operates the jaws is internal to the frame. The pump mechanism can be internal to the frame or part of the valve body subassembly.

In other embodiments, the frame comprises a tool body having operating jaws. The valve body containing the pump mechanism, fluid reservoir and hydraulic driving mechanism are removably secured within the tool body so that the tool has an exterior appearance and shape similar to conventional tools. In one embodiment the driving mechanism is a hydraulic cylinder and piston having one end of the cylinder pivotally attached to the tool body and one end of the piston pivotally attached to a pivoting jaw. In another embodiment, the driving piston and cylinder have a substantially arcuate shape to reduce the overall size of the tool. In another embodiment, the hydraulic driving mechanism is a resilient circular torus having one portion pivotally attached to the tool body and another portion pivotally attached to a pivoting jaw. The torus has an internal stiffening rim which directs force radially outward from the center of the torus as the torus is pressurized by the hydraulic fluid. When hydraulic pressure is relieved, resilient character of the torus opens the jaws.

In another embodiment, the fluid reservoir and valve body containing the hydraulic pump are removably received in a frame having a handle for operating the pump and a relief trigger for allowing hydraulic fluid to return to the reservoir. A hydraulic fitting is provided on the valve body for attachment of an external hydraulic hose. This embodiment provides a portable hydraulic power source which may be used with a variety of conventionally available hydraulic mechanisms.

In yet another embodiment, the handle and relief trigger of the previous embodiment are replaced with foot pedals and the hydraulic hose is connected to a hydraulic table vise which operates in a fashion similar to conventional table vises. However, the opening and closing of the vise is controlled by the foot pedals, leaving the hands free to manipulate an object contained in the jaws of the vise.

In all of the above embodiments, the pump can utilize a two-stage mechanism which increases the power transfer ratio of the tool after the jaws of the tool have closed down on an object in the jaws. The mechanism can comprise a bifurcated piston within the pump cylinder, wherein the piston has an outer annular piston having a central inner piston mounted for reciprocal motion within the outer piston. When the jaws of the tool are closing but have not yet contacted the object in the jaws, both pistons move together to displace a large volume of fluid from the cylinder on each piston stroke. When the jaws of the tool bear down on the object and therefore increase the hydraulic pressure in the pump cylinder, the outer piston is disengaged from the inner piston and only the inner piston reciprocates to displace fluid from the cylinder. Thus, a much smaller amount of fluid is displaced with each pump piston stroke increasing the mechanical advantage of the tool, allowing large forces to be exerted by the jaws on the object. A recovery spring biases the outer piston to the rear of the pump cylinder to fill the pump cylinder quickly with hydraulic fluid from the reservoir when the outer piston is disengaged from the inner piston. The inner piston then immediately applies mechanical work to the jaws of the tool rather than to filling the pump cylinder with fluid.

In all of the embodiments, detachable couplings are provided between the various hydraulic subassemblies.

BRIEF DESCRIPTION OF THE DRAWINGS

FIG. 5 is a partial, sectional side elevational view of a tool employing the present invention with a modified driving cylinder.

FIG. 6 is a sectional view taken along line 6—6 of FIG. 5.

FIG. 7 is a sectional side elevational view of the tool of FIG. 5 utilizing a different hydraulic driving mechanism.

FIG. 8 is a partial, sectional side elevational view of the tool of FIG. 5 utilizing yet another hydraulic actuating mechanism.

FIGS. 9, 10 and 11 are enlarged, sectional, side elevational views of a two-stage hydraulic pump usable with the various embodiments of the hydraulic tool of the present invention.

FIG. 12 is a sectional side elevational view of a hydraulic tool employing the modular fluid reservoir and valve body assembly of the present invention in use with a conventional hydraulic device.

FIG. 13 is a perspective view of the tool of FIG. 12 in use.

FIG. 14 is a schematic representation of a hydraulic table vise employing the present invention.

BEST MODE FOR CARRYING OUT THE INVENTION

Figure 1:
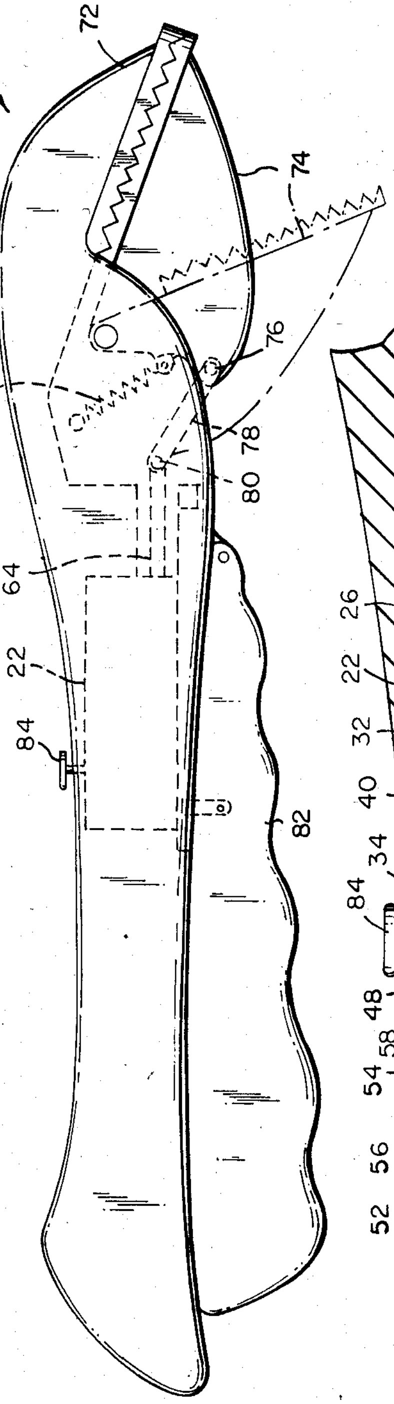
FIG. 1 is a side elevational view of a tool employing the present invention.
Figure 2:
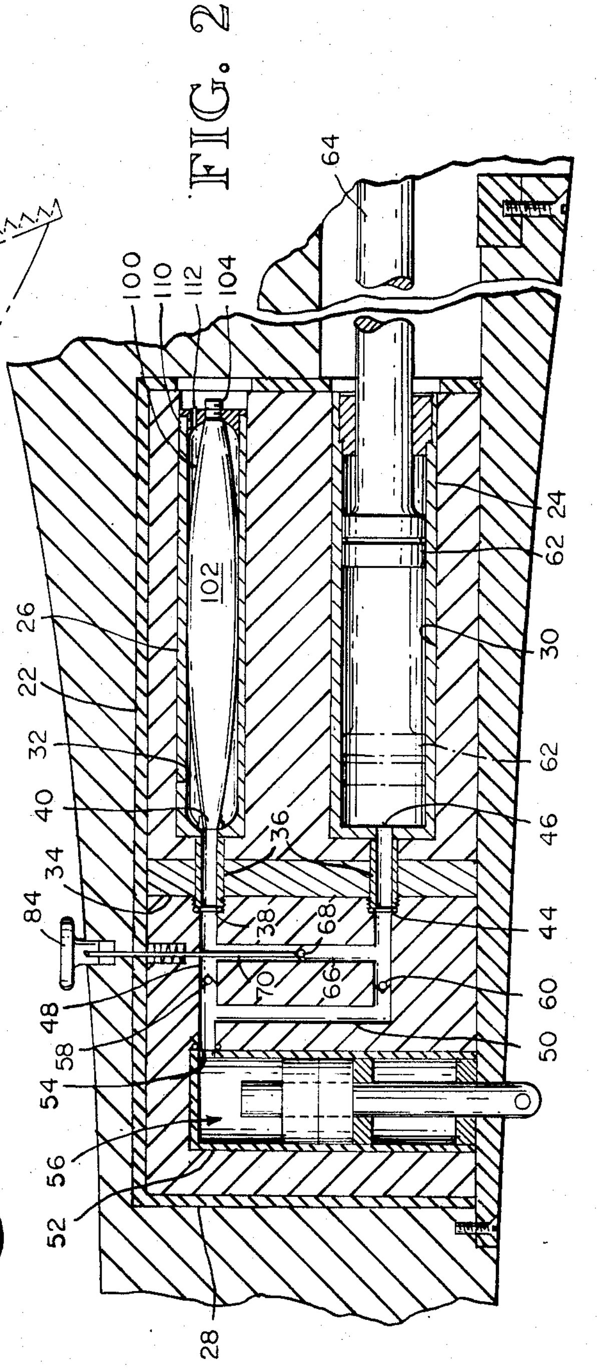
FIG. 2 is an enlarged, partial, sectional side elevational view of the tool of FIG. 1.

In FIGS. 1 and 2, a first embodiment of a hydraulic tool employing the present invention is generally indicated at reference numeral 20. The tool has an interchangeable frame 22 containing a removable driving cylinder 24, a removable fluid reservoir 26 and a removable valve body assembly 28. The driving cylinder, fluid reservoir and valve body assembly can be secured to the frame by set screws or a cover which is secured to the frame. The frame has a driving cylinder receptacle 30, a fluid reservoir receptacle 32 and a valve body receptacle 34 which are sized to receive the driving cylinder, fluid reservoir and valve body assembly respectively. Removable hydraulic couplings 36 connect the driving cylinder 24 and fluid reservoir 26 to the valve body 28.

The valve body has a fluid input port 38 which communicates with a reservoir fluid outlet 40 through the hydraulic coupling 36 to provide hydraulic fluid to the valve body assembly. The valve body assembly also has a fluid output port 44 which communicates with a driving cylinder fluid outlet 46 to allow hydraulic fluid from the valve body to enter the driving cylinder. The valve body has an input conduit 48 and an output conduit 50 which connect the input and output ports with a pump cylinder 52 through a pump outlet 54.

Hydraulic fluid in the fluid reservoir 26 is drawn through input conduit 48 to the pump cylinder 52 when a pump piston 56 is drawn to the end of the pump cylinder. A one-way input valve 58 allows fluid to flow from the reservoir to the pump outlet 54 through the input conduit but not in the reverse direction. Thus, when the pump piston returns to the end of the cylinder having the pump outlet 54, fluid cannot return to the fluid reservoir and is forced into the driving cylinder 24 through the output conduit 50. A one-way output valve 60 is provided in the output conduit to allow fluid flow from the pump outlet 54 to the fluid output port 44 but which prevents fluid flow in the reverse direction. Thus, as the driving piston 62 is displaced from its retracted position within the driving cylinder, any reaction forces experienced by the driving rod 64 cannot force fluid back into the pump cylinder 52 or fluid reservoir 26. A bypass conduit 66 is provided between the input and output conduits to allow hydraulic fluid in the driving cylinder 24 to return to the fluid reservoir 26 when a one-way relief valve 68 is operated by a pressure relief rod 70. The input, output, and relief valves are shown schematically in the drawings and are to be implemented in a manner consistent with the state of the art. The innerconnections shown between the input conduit, output conduit, bypass conduit and pump cylinder are also only illustrative. Other methods for connecting the input and output ports to the pump cylinder can also be substituted as will be appreciated by those skilled in the art.

The interchangeable frame 22 therefore, comprises a replaceable, unitary hydraulic system which may be interchanged into any number of tools having a body designed to receive the frame. The first embodiment 20 of the hydraulic tool is just one example of any number of tools which could be designed to accommodate the frame 22.

The first embodiment shown in FIG. 1 has a fixed jaw 72 and a pivoting jaw 74 which is pivotally connected by a pin 76 through a connecting rod 78 and a pin 80 to the driving rod 64 of the driving piston 24. The tool 20 also has a pump handle 82 for reciprocating the pump piston 56 within the pump cylinder 52. A pressure relief trigger 84 depresses the pressure relief rod 70 to operate the relief valve 68, allowing the pivoting jaw 74 to open. A bias spring 86 is connected between the tool and the connecting rod 78 or another portion of the pivoting jaw 74 to open the jaw when the pressure relief trigger 84 is depressed.

The removable fluid reservoir 26 is provided with a resilient bladder 100 which is preferably filled with hydraulic fluid 102 until the bladder is resiliently deformed. A bleed valve 104 is provided to expel air from the hydraulic system after the fluid outlet 40 has been connected to the input port 38 to remove air from the entire hydraulic circuit. The hydraulic fluid 102 is thus moderately pressurized whether or not the pump piston 56 is operating. The tool 20 can be used in any position since all portions of the hydraulic circuit are charged with fluid and since the pump cylinder 52 is not dependent on gravity to fill the cylinder with fluid. The bladder 100 is contained in a reservoir housing 110 which is sized to be received in the reservoir receptacle 32. A vent 112 allows air to enter and exit the housing as the fluid 102 is shuttled between the various parts of the hydraulic circuit.

Figure 3:
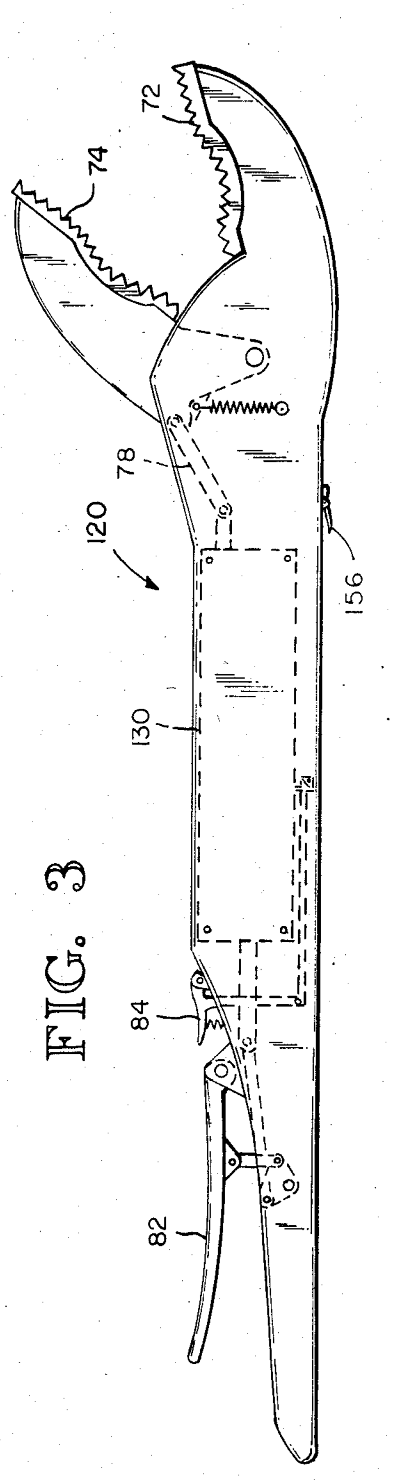
FIG. 3 is a side elevational view of a tool employing a second embodiment of the present invention.
Figure 4:
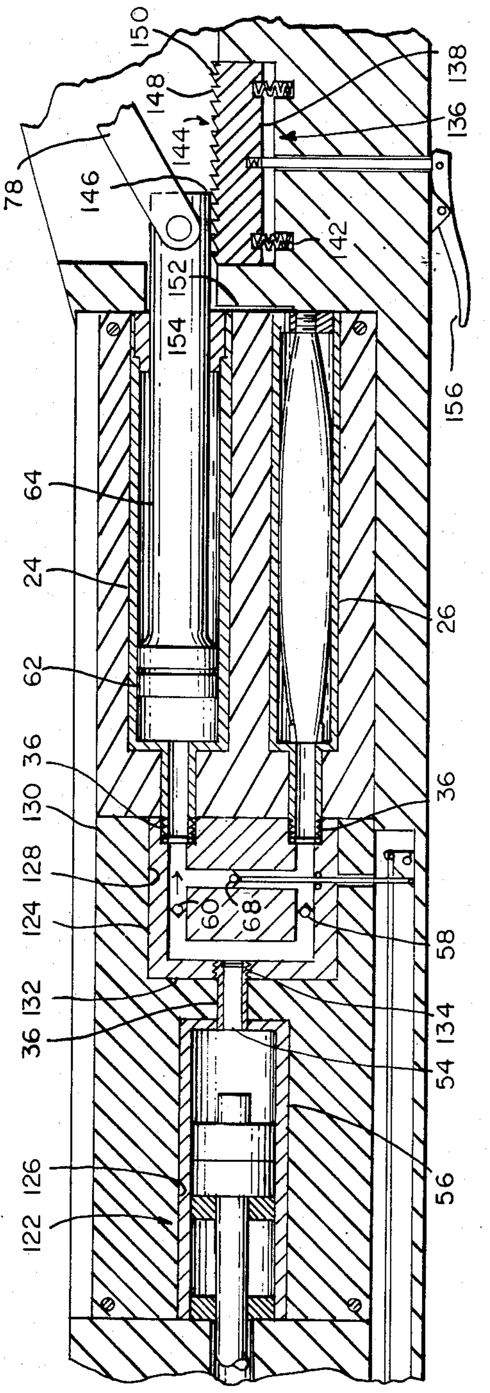
FIG. 4 is an enlarged, partial, sectional side elevational view of the tool of FIG. 3.

In FIGS. 3 and 4, a second embodiment of a hydraulic tool 120 is illustrated. In this embodiment, the pump 122 is external to the valve body 124. The pump and the valve body are each received in their individual receptacles 126 and 128 within the interchangeable frame 130. The valve body 132 is provided with a pump port 134 which communicates with the pump outlet 54 through a removable hydraulic coupling 36. In this embodiment, the tool 120 is considerably longer than the first embodiment and is able to exert greater torques on objects contained within the jaws 72 and 74 due to the longer length of the tool body (approximately 36 inches).

To prevent damage to the output valve 60 and relief valve 68 due to excessive back pressure within the driving cylinder 24, a sliding block mechanism, generally indicated by reference numeral 136, is provided in the tool body 120. The sliding block mechanism transfers reaction forces from the pivoting jaw 74 to the body of the tool instead of to the driving rod 64 and valves 60 and 68. The sliding block mechanism has a sliding block 138 spring biased against the tool body 120 by springs 142. The block has ramps 144 which engage a projection 146 on the driving rod 64.

As the driving rod 64 moves the pivoting jaw 74 to the closed position, the sliding block 138 moves towards the tool body 120 against the spring bias. The projection 146 forces the inclined portions 148 of the ramps 144 downwardly. When the user pushes on the pump handle of the tool body to exert torque on an object in the jaws, the projection 146 is forced against the vertical portions 150 of the ramps causing one end 152 of the sliding block 138 to react against a portion 154 of the tool body. Thus, reaction forces experienced by the jaw 74 are not transferred to the driving piston 62 and to the valves within the valve body, but are transferred directly to the tool body itself at portion 154. The vertical portions 150 of the ramps can be disengaged from the projection 146 by depression of button 156 against the force of the spring 142. Once the ramps 144 have been disengaged from the projection 146, the pressure relief trigger 84 can be depressed to allow the bias spring 86 to open the jaws and return the fluid in the driving cylinder to the fluid reservoir through the bypass conduit.

FIGS. 5, 6, 7 and 8 show alternate tool embodiments wherein the tool body is the frame for the valve body assembly, fluid reservoir and driving mechanism. The tool bodies 160 are substantially hollow, the walls 162 and 164 of the tool forming the receptacles for the removable fluid reservoir 26, removable valve body assembly 28 and hydraulic driving mechanism 166. The fluid reservoir and valve body can be secured to the tool body frame 160 by set screws 168 or another suitable means.

The fluid reservoir 26 is identical to and interchangeable with the fluid reservoir shown in FIG. 2. The valve body assembly 28, however, has a slightly different physical arrangement of the input and output conduits which has input and output ports 38 and 44 on opposite sides of the valve body assembly as shown in FIG. 5 instead of being on the same side of the valve body assembly as shown in FIG. 2. The hydraulic mechanism 166 shown in FIG. 3 has a crescent shaped driving cylinder 170 and an internally mounted crescent shaped driving piston 172. The driving piston 172 is pivotally connected by a pin 174 to the pivoting jaw 74. The driving cylinder 170 is pivotally connected to the tool body 160 by a pin 178. This type of mounting allows the piston to move in an arc within the driving cylinder without binding the driving rod 178 against the internal seals 180 at the end of the driving cylinder. The crescent shape of the driving cylinder and driving piston allows the tool body 160 to assume a shape similar to a conventional vise-grip type tool. This configuration would be used when a smaller hand tool requiring lower jaw operating forces is desired. As shown in FIG. 6, the driving cylinder and piston are preferably substantially rectangular in cross section to facilitate fitting the hydraulic driving mechanism between the walls 162 and 164 of the tool body 160. A bias spring 86 is provided to relieve hydraulic pressure in the cylinder when the pressure relief trigger 84 is depressed.

FIG. 7 illustrates a different embodiment of the tool shown in FIG. 5. The tool body 160 utilizes the same removable fluid reservoir 26 and valve body assembly 28 as the embodiment shown in FIG. 5. However in this embodiment, the hydraulic driving mechanism comprises a resilient torus 200 having a first cup 210 pivotally connecting a portion of the outer surface 212 of the torus to the tool body 160 through pin 214. The opposite outer surface of the torus is pivotally connected to the pivotable jaw 74 through a second cup 216 and a linkage 218. The linkage 218 has a first pin 220 connected to the second cup 216 and a second pin 222 connecting the linkage to the pivoting jaw 74. Thus, when hydraulic fluid passes to the torus through a torus fluid outlet 224 from the valve body assembly output port 44 the radial expansion of the torus causes the pivoting jaw 74 to close. The hub 226 of the torus is reinforced with a substantially rigid rim 228 which causes the hydraulic pressure from the pump to direct the expansion of the torus in the radially outward direction. Depression of the pressure relief trigger 84 allows hydraulic fluid to exit the resilient torus through the torus fluid outlet 224 and through the bypass conduit 66 into the fluid reservoir 26.

Portions of the outer surface 212 can be bonded to the first and second cups 210 and 216. The resilient character of the torus will cause the jaws to open when the hydraulic pressure is relieved. Alternately, a bias spring 86 can be provided as shown in FIG. 5. FIG. 8 shows another embodiment of the invention shown in FIGS. 5, 6, 7 and 8. The same removable fluid reservoir 26 and removable valve body assembly 28 as shown in FIGS. 6 and 7 are used. The hydraulic driving mechanism 166, however, comprises a short and stubby hydraulic cylinder and piston arrangement 229 having the cylinder pivotally connected to the body and the piston pivotally connected to the pivoting jaw 74 in a fashion similar to the previous embodiments. This arrangement allows a relatively large power transfer ratio to be applied in a relatively small tool. In this embodiment, the cross sectional area of the driving piston is substantially larger than the cross section of the pump piston so that pressures on the order of 1,500 to 1,800 pounds per square inch can be delivered by the jaws of the tool onto an object therebetween.

TWO-STAGE PUMP

In all of the above embodiments it is preferred to utilize a two-stage pump piston within the pump cylinder to allow the jaws to quickly close upon an object contained between the jaws and then to apply large forces to the object therebetween. As shown in FIGS. 9 through 11, a two-stage pump piston can be utilized to achieve this result. The pump piston 56 has an outer annular piston 230 mounted for reciprocal motion within the pump cylinder 52. An inner piston 232 is mounted for reciprocal motion within the bore 234 of the outer piston 230. The inner piston 232 is connected to the pump handle 82 by a pump rod 236. The inner piston 232 has a divot 238 which can be engaged by spherical bearings 240 which are mounted in receptacles 244 within the outer piston 230. The spherical bearings are biased by springs 246 into the bore 234 to engage the divot 238 causing the inner and outer pistons to move together as a single unit.

When hydraulic pressure in the cylinder 56 reaches a predetermined level (determined by the strength of bias springs 246) the outer piston 230 becomes disengaged from the inner piston and is forced to the back 248 of the pump cylinder by a recovery spring 250. This allows the pressurized fluid from the fluid reservoir to fill the pump cylinder with fluid. Thus, upon the first subsequent stroke of the inner piston 232, a high-pressure pulse of oil is delivered to the output port 44 of the valve body. Unitary operation of the pistons 230 and 236 cause the jaws of a tool to quickly close upon an object contained in the Jaws. Once the jaws contact the object, hydraulic back pressure disengages the outer coaxial piston from the inner piston. The recovery spring 250 forces the outer piston to the back of the pump cylinder allowing the cylinder to fill with oil from the reservoir. The inner piston now delivers high pressure to the tool jaw through the improved mechanical advantage. In this way, quick operation need not be compromised for good mechanical advantage.

FIGS. 9 and 10 show the spherical bearings 240 engaging the divot 232 on the pump rod 238 causing the inner and outer pistons to move together. FIG. 11 shows the outer piston disengaged from the inner piston. The recovery spring 250 has moved the outer piston to the end 240 of the cylinder and the inner piston is free to reciprocate within the bore 234. The spherical bearings will automatically re-engage the divots 238 when the inner piston is fully retracted and when the hydraulic pressure drops below the predetermined level. The recovery spring 250 is relatively weak so as to avoid disengaging the outer piston from the inner piston until the predetermined hydraulic pressure is achieved.

FIG. 12 illustrates a hand-held version of a portable hydraulic power unit 252. The tool body 254 has receptacles 256 and 258 for the removable fluid reservoir 26 and valve body assembly 28 as previously described. The body has an extension 260 terminating in a hydraulic fitting 262 which allows the portable power unit to be connected to a conventional hydraulic hose 264. The extension has a fluid passageway 266 which communicates with the valve body assembly output port 44 through removable hydraulic coupling 36. The portable hydraulic power unit can be used to power a variety of conventionally available tools and yet to be developed tools which require hydraulic pressure for operation. FIG. 13 shows the hand-held device in use with an external hydraulic tool 267.

FIG. 19 illustrates a foot-operated version 270 of the portable hydraulic power unit 252 of FIG. 13. In this embodiment, the pump handle 82 is replaced by a first foot pedal 272 and the pressure relief trigger 84 is replaced by a second foot pedal 274. The hydraulic hose 264 is shown connected to a hydraulic table vise 276 having a driving mechanism 278 (which can comprise a hydraulic cylinder and piston arrangement) which is adapted to close the jaws 280 and 282 when the first pedal is operated. A return spring 284 can be provided to bias the jaws to an open position, and can open the jaws when the second foot pedal 274 is depressed. This embodiment allows an operator to use both hands to position an object in the jaws while one foot can be used to operate the vise itself.

It is to be understood that the tool embodiments shown in FIGS. 12 and 19 can be applied to a large variety of hydraulically operated tools which will be well apparent to those skilled in the art.

All of the above embodiments described benefit from the use of the removable valve body assemblies 28, fluid reservoirs 26 and hydraulic driving mechanisms. If any one of these elements fails, that individual subassembly can be removed for repair and a replacement installed while the first unit is being repaired. Thus, down time with this family of hydraulic tools is minimized. To the extent that the various subassemblies are interchangeable, the possession of two tools utilizing the interchangeable subassemblies virtually eliminates substantial down time. Thus, an industrial user who may purchase a large number of these tools benefits from the advantages of the hydraulic tools as described without suffering from the down time and operational problems of other self-contained hydraulic tools.

It will be appreciated that other variations and embodiments of the invention utilizing the same basic inventive concepts are contemplated. Therefore, the scope of the invention is not to be limited by the above description but is to be determined by the claims which follow.

I claim:

1. A modular hydraulic power unit for use in various tool bodies, comprising:

a removable, modular fluid reservoir having a fluid outlet and means for maintaining a volume of hydraulic fluid under pressure;

a fluid pump having a fluid containing cylinder with a fluid outlet at one end and fluid displacing piston mounted for reciprocal motion within the cylinder wherein depression of the piston towards the fluid outlet end displaces fluid from the cylinder;

a removable, modular valve body having a fluid input port, a fluid output port, an input conduit between the input port and the pump cylinder outlet on the fluid pump including means within the input conduit for permitting fluid flow from the fluid reservoir to the pump cylinder when the pump piston is retracted and for preventing fluid return to the reservoir through the input conduit when the pump piston is depressed, an output conduit between the pump cylinder outlet and the exit port including means within the output conduit for allowing fluid displaced from the pump cylinder to exit the valve body through the output port and for preventing fluid return to the pump cylinder through the output conduit, and a bypass conduit between the exit port and the input port including selectively operable bypass means for returning fluid from the exit port·to the fluid reservoir through the bypass conduit;

detachable couplings connecting the fluid reservoir outlet to the valve body input port allowing fluid flow therebetween; and a frame having a valve body receptacle and a fluid reservoir receptacle including means for releasably securing the valve body and fluid reservoir within the receptacles.

2. The unit of claim 1 including removable means for converting hydraulic pressure from fluid at the fluid output on the valve body to a usably force and also including a detachable coupling connecting the valve body output port to the pressure converting means.

3. The unit of claim 2 wherein the pressure converting means is a hydraulic driving cylinder having an internal reciprocally mounted driving piston having a piston rod at one end, the piston and cylinder converting the hydraulic pressure to useful, substantially linear force at the free end of the piston rod.

4. The unit of claim 3 wherein the driving cylinder is internal to the frame and wherein the frame has a driving cylinder receptacle and means for releasably securing the driving cylinder within the receptacle.

5. The unit of claim 4 wherein the fluid pump is external to the valve body and wherein the valve body has a pump port communicating with the valve body input and output conduits including a detachable coupling between the pump port on the valve body and the pump cylinder outlet on the fluid pump for connecting the pump cylinder outlet with the valve body pump port and wherein the frame has a fluid pump receptacle and means for releasably securing the pump to the frame.

6. The unit of claim 5 including a tool body having a frame receptacle and means for releasably securing the frame within the receptacle, the tool body having at least one pivotally connected jaw and one other jaw and means for connecting the pivoting jaw to the free end of the driving piston rod and means for manually reciprocating the pump piston so that reciprocation of the pump piston causes the jaws to close, the tool body also having means for opening the jaws when the selectively operable bypass means on the valve body is operated to relieve hydraulic pressure in the driving cylinder.

7. The unit of claim 6 including defeatable means for transferring reaction forces from the pivoting jaw to the tool body and for preventing reaction forces from depressing the driving piston into the driving cylinder, the reaction force transferring means being defeatable to allow the jaws to open when the selectively operable bypass means is operated.

8. The unit of claim 7 wherein the reaction force transferring means comprises a spring biased block slidably received in the tool body having a series of inclined ramps and wherein the driving piston rod has a projection sized to engage the ramps and slide the block in the counter-bias direction as the jaws close, the projection engaging a portion of the ramps and forcing the block transverse to the sliding direction, against the tool body when the pivoting jaw experiences a reaction force.

9. The unit of claim 4 including a tool body having a frame receptacle and means for releasably securing the frame within the receptacle, the tool body having at least one pivotally connected jaw and one other jaw and means for connecting the pivoting jaw to the free end of the driving piston rod and means for manually reciprocating the pump piston so that reciprocation of the pump piston causes the jaws to close, the tool body also having means for opening the jaws when the selectively operable bypass means on the valve body is operated to relieve hydraulic pressure in the driving cylinder.

10. The unit of claim 9 wherein the fluid pump is located within and internal to the valve body and wherein the pump cylinder outlet communicates directly with the input and output conduits in the valve body.

11. The unit of claim 1 wherein the frame is a tool body having a valve body receptacle and a fluid reservoir receptacle and means for releasably securing the valve body and fluid reservoir within the receptacle and means for manually reciprocating the pump piston, the tool body also having means for connecting the fluid output port on the valve body to one end of an external hydraulic hose.

12. The unit of claim 11 wherein the manual pump reciprocating means is a first foot pedal and wherein a second foot pedal operates the bypass means on the valve body.

13. The unit of claim 12 includes a hydraulic bench vise having opposed jaws, the first jaw being fixed and the second jaw being movable, in sliding relation to the first jaw, between an open and a closed position, the bench vise also having means for hydraulically closing. the jaws and means for biasing the jaws to the open position, the hydraulic closing means having a fixture to receive the free end of the hydraulic hose.

14. The unit of claim 13 wherein the fluid pump is located within and internal to the valve body and wherein the pump cylinder outlet communicates directly with the input and output conduits in the valve body.

15. The unit of claim 2 wherein the fluid pump is located within and internal to the valve body and wherein the pump cylinder outlet communicates directly with the input and output conduits in the valve body. And wherein the frame is a tool body having means for manually reciprocating the pump piston and an elongated handle having walls forming the fluid reservoir receptacle and the valve body receptacle and also forming a receptacle for the pressure converting means, the tool body also having at least one pivotally connected jaw and one other jaw wherein one portion of the pressure converting means is pivotally connected to the tool body and a second portion of the pressure converting means is pivotally connected to the pivoting jaw so that reciprocation of the pump piston causes the jaws to close and operation of the bypass means allows the jaws to open.

16. The unit of claim 15 wherein the pressure converting means is a hydraulic driving cylinder having an internal piston mounted for reciprocal motion within the cylinder, the cylinder being pivotally mounted to the tool body within the pressure converting means receptacle, the piston having a piston rod pivotally connected to the pivoting jaw and means for biasing the pivoting jaw to the open position.

17. The unit of claim 16 wherein the driving cylinder and piston are substantially curved and wherein the piston reciprocates within the cylinder in an arcuate path.

18. The unit of claim 16 wherein the driving cylinder and piston are substantially rectangular in cross-section.

19. The unit of claim 15 wherein the pressure converting means is a resilient torus.

20. The unit of claim 19 wherein the resilient torus has a central stiffening rim.

21. The unit of claim 1 wherein the reservoir has a housing for mounting the reservoir within the reservoir receptacle and wherein the pressure maintaining means comprises a resilient bladder within the housing having an unexpanded volume which is less than the volume of the housing.

22. The unit of claim 21 including a bleed valve on the bladder to remove air from the bladder, fluid pump and valve body conduits.

23. The unit of claim 22 including a vent on the housing to allow air to exit the housing when the bladder fills with fluid and to enter the housing when the bladder expels fluid through the fluid outlet.

24. The unit of claim 1 wherein the fluid pump has means for varying the volume of fluid displaced by the piston.

25. The unit of claim 24 wherein the displacement varying means comprises a second, disengagable outer piston coaxially mounted to the fluid displacing piston and reciprocally mounted within the pump cylinder where in the first inner piston displaces a smaller volume than the outer piston and automatic means for engaging the inner piston with the outer piston and for disengaging the pistons when the hydraulic pressure within the cylinder achieves a predetermined value.

26. The unit of claim 25 including means for moving the outer coaxial piston towards the end of the cylinder opposite the fluid outlet when the coaxial pistons are disengaged to quickly fill the cylinder with fluid from the fluid reservoir.

27. The unit of claim 26 wherein the outer coaxial piston moving means is a spring.

* * * * *